United States Patent [19]

Olson et al.

[11] Patent Number: 4,627,045

[45] Date of Patent: Dec. 2, 1986

[54] ALTERNATING COMMUNICATION CHANNEL SWITCHOVER SYSTEM

[75] Inventors: Gene H. Olson, Minneapolis; Dennis A. Quy, Apple Valley, both of Minn.

[73] Assignee: Rosemount Inc., Eden Prairie, Minn.

[21] Appl. No.: 580,112

[22] Filed: Feb. 14, 1984

[51] Int. Cl.[4] .................. H04J 1/16; G06F 11/00; H04B 11/16

[52] U.S. Cl. ................................. 370/16; 371/8; 455/179

[58] Field of Search ............. 370/13, 16, 17, 85, 370/14; 455/179; 371/8; 375/40

[56] References Cited

U.S. PATENT DOCUMENTS

| | | | |
|---|---|---|---|
| 3,882,456 | 5/1975 | Takada | 371/8 |
| 3,913,017 | 10/1975 | Imaseki | 455/56 |
| 4,009,469 | 2/1977 | Boudreau et al. | 370/16 |
| 4,092,600 | 5/1978 | Zimmermann et al. | 455/56 |
| 4,347,605 | 8/1982 | Hashizume et al. | 370/16 |
| 4,365,347 | 12/1982 | Otsuka et al. | 455/179 |
| 4,374,436 | 2/1983 | Armstrong | 370/16 |

*Primary Examiner*—Douglas W. Olms
*Assistant Examiner*—Frank M. Scotch, III
*Attorney, Agent, or Firm*—Kinney & Lange

[57] ABSTRACT

A redundant common communication system for a distributed process control or data processing system has multiple stations which are coupled to at least two redundant communication channels (such as communication busses). Each station includes a transmitter for transmitting data packets and a receiver for receiving data packets. Each data packet includes a channel selection field which identifies a selected channel to be used by all station during a succeeding transmission of a data packet. Each station makes an assessment of quality of each channel based upon the occurrence of errors when that channel is in use. The station computes a margin value based upon assessed quality factors. When the station gets an opportunity to transmit, the channel selection field of the transmitted packet identifies a channel which is selected based upon the margin value and the frequency of previous use of each of the channels. As a result, frequent switching among the channels occurs, with the percentage of use of each channel being dependent upon the assessed quality of that channel by the various stations.

19 Claims, 2 Drawing Figures

ALTERNATING COMMUNICATION CHANNEL SWITCHOVER SYSTEM

REFERENCE TO COPENDING APPLICATIONS

Reference is hereby made to our following copending applications filed on even date herewith and assigned to the same assignee which are hereby incorporated by reference: Ser. No. 580,007, filed Feb. 14, 1984; Ser. No. 580,070, filed Feb. 14, 1984; and Ser. No. 580,006, filed Feb. 14, 1984.

BACKGROUND OF THE INVENTION

1. Field of the Invention.

The present invention relates to a redundant common communication system in which a plurality of nodes or stations are coupled to a plurality of redundant communication channels (such as communication busses) for transmitting data packets among the various stations.

2. Description of the Prior Art.

Distributed data processing and process control systems generally use a common communication system, such as a communication bus, for transferring packets of data among the various stations. An example of this type of system is a distributed process control system, in which the stations include process controllers, control consoles, and other data processing devices which share a common communication bus.

Because of the need for high reliability, distributed process control systems generally utilize a multi-channel redundant common communication system for transmitting packets of data among the stations. This redundant system normally takes the form of a pimary communication bus and a redundant communication bus, both of which are coupled to each of the stations in the system. Each station is designed so that a failure of a single component should not disable both busses. Upon failure of the primary bus, it is switched off and the redundant bus is switched on to transmit and receive data packets. If the redundant bus is operable, the process control system performs normally.

In the past, distributed systems having a redundant bus architecture have relied partially or entirely on direct human intervention for some aspects of switchover between the primary and the redundant bus. For example, in one type of system, switching from the primary bus to the redundant bus occurs automatically, but the stations must be manually reset to the primary bus after it has been repaired.

One problem with the prior art systems which use a primary bus and an inactive redundant bus is that the operability of the inactive redundant bus is not known until there is a failure of the primary bus. If the redundant bus also is defective, the entire system fails.

Another disadvantage of the prior art systems is that significant amounts of data may be lost before the primary bus (or the redundant bus) is determined to have failed. Because process control systems generally control chemical, manufacturing or other industrial processes, the reliability of the data communication among stations is of critical importance.

SUMMARY OF THE INVENTION

The present invention is a redundant common communication system for transmission of data packets among a plurality of stations which are coupled to a plurality of redundant communication channels. In the present invention, transmission among the stations is alternated among the communication channels based upon a quality assessment of each channel, and the frequency of previous use of each of the channels. The selection of the channel to be used in transmission of one or more data packets is contained in a channel selection field within a data packet transmitted by one of the stations.

Each station of the system preferably includes transmitter means for transmitting data packets, receiver means for receiving data packets, quality assessment means, margin computation means, means for coupling the station to a selected channel, and means for determining the selected channel to be identified. In this embodiment, each station participates in selection of the selected channel for a succeeding transmission of a data packet.

Each data packet transmitted by the transmitter means preferably includes a channel selection field which identifies the selected channel for a succeeding transmission of a data packet. The receiver means derives the selected channel for the next packet to be transmitted from the channel selection field of the received packet. The receiver means also detects communication errors which include, for example, data packets which are received in error (as indicated by check sums, parity bits and other error encoding of the data packets), transmitted data packets which are in error, data packets which are not received when expected, and acknowledgments which are not received from other stations.

The quality assessment means maintains quality factors for each channel based upon the occurrence of communication errors when that channel is in use. In preferred embodiments, both local and group quality factors are maintained. The local quality factors are based upon the experience of that station in using each of the channels. The group quality factors are based upon the local quality factors from the other stations in the system. The local quality factors provide for fast response to failures, while the group quality factors filter the effect of sporatic errors while taking into account failure conditions at other stations.

The margin computation means determines a margin based upon the various local and group quality factors. This margin represents the proportion of total traffic of data packets which each station attempts to route over each of the channels.

Each data packet contains a field which specifies which communication channel should be used by the following message. This field is then received with each data packet, and makes the determination of the channel to be used by all of the stations in a succeeding transmission and reception of a data packet over the communication system.

When a particular station gets an opportunity to transmit, it includes in the data packet which it transmits, a channel selection field which identifies the selected channel to be used in a succeeding transmission. The means for determining the selected channel identified by the channel selection field bases this determination upon the margin computed by the margin computation means of that station, and the frequency of previous use of each of the channels. As a result, the traffic of data packets is distributed among the channels, and bears a relationship to the assessed quality of each of the channels. If one of the channels fails entirely, the margin will shift so that essentially all traffic will be routed over the channel or channels which are still in good operating condition.

In preferred embodiments, each station also includes means for manually selecting the margin for that station, or for all of the stations in the system. This manual override margin selection allows service personnel to force a system to increase traffic on a bad channel for system maintenance and repair purposes.

The system also preferably includes alternate channel signal detection means which detects the presence of traffic on the channel which is not selected. This provides useful data for maintenance functions, and indicates potential error conditions. For example, if a station is expecting a data packet on one channel, and signals are received on the unselected channel, this indicates a potential error condition at the station, at some other station in the system, or in one of the channels.

Important benefits arise from the alternating and selective switching between multiple channels as provided in the present invention. Rather than replying on a redundant bus or channel which may or may not be operable, the channels in the present invention are selectively alternated on a continuous basis such that their operating condition is continuously monitored. This prevents undetected failure of an inactive redundant channel, as can occur in the prior art systems. With the present invention, as a channel starts to fail, it is used less frequently as its quality deteriorates in relation to the other channel. Even minor problems of a channel will cause desirable shifts in the number of data packets carried on that channel, such that the channel which is in the best operating condition carriers more data packets.

DETAILED DESCRIPTION OF THE PREFERRED EMBODIMENTS

Figure 1:
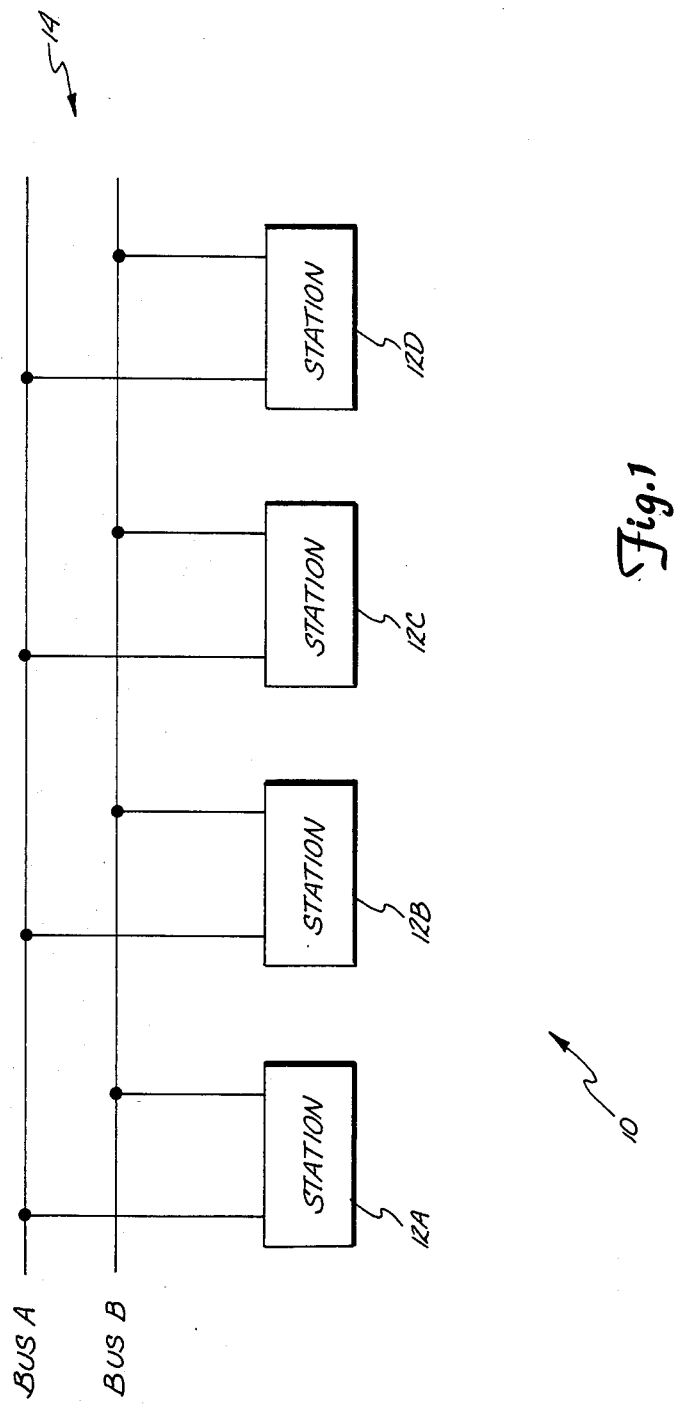
FIG. 1 is a block diagram of a communication system having four stations coupled to two common busses.

In the embodiment shown in FIG. 1, a redundant common communication system 10 of the present invention includes a plurality of stations 12A-12D which are coupled to a communication medium 14 which has a plurality of redundant communication channels (in this example, bus A and bus B). Stations 12A-12D preferably comprise stations in a distributed process control or data processing system such as a microprocessor-based process controller, a CRT monitor/console, a data logger, or a main frame computer. Busses A and B each preferably comprise twin axial cables, optical waveguides or radio frequency channels for carrying signals such as serial, error-encoded digital data packets generated by stations 12A-12D.

In the embodiment shown in FIG. 1, each station 12A-12D has the capability of both sending and receiving data packets over each of the busses A and B. In other embodiments, further stations are coupled to communication medium 14 to receive data packets, but do not themselves transmit data packets.

In the present invention, stations 12A-12D selectively alternate substantially in unison between bus A and bus B for transmitting and receiving data packets. Each data packet preferably includes a channel or bus selection field which indicates which of the busses A and B will be used during transmission of at least one of the next data packets. Each station 12A-12D keeps track of which bus A or B is being used and maintains statistics on the operating condition of each bus as a function of the frequency, quality and amount of packets received on the respective busses. When its turn to transmit occurs, the station 12A, 12B, 12C or 12D selects the bus to be used during the next succeeding transmission and includes that selection in the channel section field of the data packet which it transmits. This selection is based upon that station's assessment of the quality of each bus A and B and the frequency of previous traffic on each bus.

Figure 2:
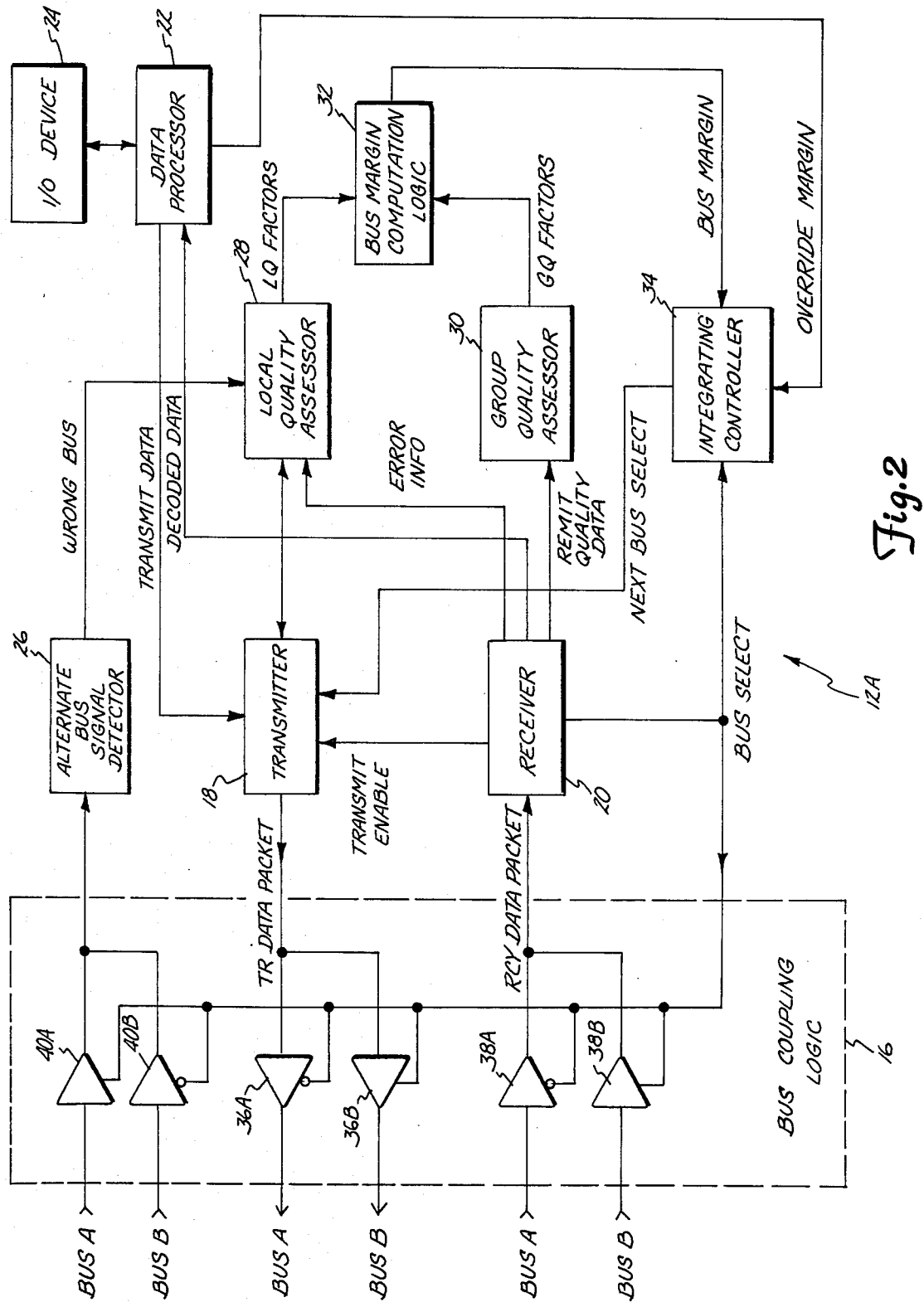
FIG. 2 is a detailed block diagram of one of the stations of FIG. 1 coupled to two common busses.

FIG. 2 shows a detailed block diagram of station 12A, which is typical of stations 12A-12D of system 10 shown in FIG. 1. In the embodiment shown in FIG. 2, station 12A includes bus coupling logic 16, transmitter 18, receiver 20, data processor 22, input/output (I/O) device 24, alternate bus signal detector 26, local quality assessor 28, group quality assessor 30, bus margin computation logic 32, and integrating controller 34.

Bus coupling logic 16, which includes switches 36A, 36B, 38A, 38B, 40A and 40B connect station 12A to bus A and bus B for transmission and reception of data packets. Switches 36A and 36B control the selection of bus A or bus B, respectively, for transmisson of a data packet from transmitter 18 based upon a Bus Select signal from receiver 20. Switches 38A and 38B control the bus from which data packets are received and routed to receiver 20 based upon the Bus Select signal. Switches 40A and 40B control reception of data by alternate bus signal detector 26 from the bus which is not being used by transmitter 18 and receiver 20.

Transmitter 18 encodes and transmits data packets based upon data received from data processor 22. Included in the data packet is a channel or bus selection field which identifies the bus to be used by all stations of system 10 during the next transmission of a data packet. The contents of the channel selection field are received by transmitter 18 from integrating controller 34 as a Next Bus Select signal.

Receiver 20 receives and decodes data packets from either bus A or bus B as selected by bus coupling logic 16. Receiver 20 decodes all received data packets, performs error checking, detects receive time-out errors (indicating that a data packet has not been received within the expected time period), and enables message transmission according to a bus access protocol. The outputs of receiver 20 include decoded data which is supplied to data processor 22, error information which is supplied to local quality assessor 28, remote quality data which is supplied to group quality assessor 30, the Bus Select signal which is supplied to bus coupling logic 16 and integrating controller 34, and a Transmit Enable signal which is supplied to transmitter 18.

Data processor 22, which is one preferred embodiment is an MC68000 microprocessor communicates with I/O device 24 (which may, for example, be a CRT monitor and keyboard, or may be a process controller which includes parameter sensors and control devices used in a process control loop(s). Data processor 22 receives decoded data from receiver 20 and provides data to be transmitted to transmitter 18. Data processor 22 also selectively provides, in a preferred embodiment, an override margin to integrating controller 34. This override margin allows manual selection of the bus margin used by integrating controller 34 in selecting the bus in the channel selection field of the transmitted data packet from transmitter 18. The override margin is selectable through I/O device 24, and is useful when maintenance or troubleshooting of system 10 is required.

Alternate bus signal detector 26 listens for data transmissions on the bus which is not selected by the Bus Select signal. In other words, if transmitter 18 and receiver 20 are both connected through switches 36A and 38A to bus A, alternate bus signal detector 26 is connected through switch 40B to bus B. Conversely, if transmitter 18 and receiver 20 are connected through switches 36B and 38B, respectively, to bus B, alternate bus signal detector 26 is connected through switch 40A to bus A. The wrong bus output signal of alternate bus signal detector 26 indicates to local quality assessor 28 that data is being transmitted through communication medium 18 on the bus which is not being selected by bus coupling logic 16. This indicates a potential error condition.

Local quality assessor 28 performs statistical analysis of data acquired by station 12A from busses A and B to arrive at an overall measure of bus quality for each bus. Local quality assessor 28 takes into account such factors as (1) the proportion of received data packets which contain errors; (2) the proportion of transmitted data packets which are in error; (3) the number of received Time-Out errors per unit of time; (4) the proportion of broadcast data packets which were expected but not received by station 12A; and (5) the proportion of data packets sent by station 12A which were not acknowledged when an acknowledgment was requested. Each of these factors is multiplied by a tuning constant, and the numbers are then summed to form a local bus quality factor for each of the two busses. In preferred embodiments of the present invention, the tuning constants for each of the local quality factors is experimentally determined, in order to provide appropriate weight to those errors which most reliably correlate to bus quality. As such, the tuning constants can vary from system-to-system, and even from station-to-station within a system.

In the preferred embodiments of the present invention, each station 12A–12D periodically broadcasts a data packet over communication medium 14 which reports to all other stations the local bus quality factors from that station. When this bus quality information is received and decoded by receiver 20, it is provided to group quality assessor 30. The remote quality data are summed by group quality assessor 30 to produce a weighted average of all of the local bus quality factors from the other stations of system 10. In preferred embodiments, the group quality factors are time weighted averages, so that they are not profoundly affected by the rate of transmission, or the loss of a few data packets. These time weighted averages give greater weight to more recent errors.

Bus margin computation logic 32 uses both the local quality factors from local quality assessor 28 and group quality factors from group quality assessor 30 to determine a bus margin which reflects a desired proportion of total data packets transmitted on bus A compared to bus B. In other words, a bus margin of thirty percent means that station 12A will attempt to maintain thirty percent of all bus traffic on bus A and seventy percent on bus B.

While the determination of the bus margin from the local and group bus quality factors can use a number of different mathematical relationships, one relationship which has been found to provide good results is as follows:

Bus Margin $= (LQA + GQA)/(LQA + GQA + LQB + GQB)$ where
LQA = Local Quality Factor, Bus A
GQA = Group Quality Factor, Bus A
LQB = Local Quality Factor, Bus B
GQB = Group Quality Factor, Bus B.

It is useful to allow the bus margin to be manually adjustable throughout system 10, so that the computation performed by bus margin computation logic 32 is replaced by a manually selected margin. The override margin provided by data processor 22 allows an operator or service personnel to override the bus margin calculated by bus margin computation logic logic 32 when multiple failures occur. This also allows manually increased traffic on a failed bus in order to facilitate repair.

The actual determination of the bus to be selected in the channel selection field of the data packet transmitted by transmitter 18 is performed by integrating controller 34. This selection is made by using the recent history of bus traffic as the measured variable and the margin (either the bus margin or the override margin) as the set point to integrating controller 34. In the embodiment shown in FIG. 2, the recent history of bus traffic is indicated by the Bus Select signal from receiver 20. Integrating controller 34 is a digital integration only controller which integrates the recent history of bus traffic. The integration term produced by integrating controller 34 is constrained to a small range around zero wherein the use of each bus causes the integration term to shift an amount inversely proportional to the margin. When the sign of the integration term is positive, integrating controller 34 provides a Next Bus select signal to transmitter 18 which requests bus A. If the sign of the integration term is not positive, the Next Bus select signal from integrating controller 34 requests bus B.

In the preferred embodiment of the present invention shown in FIGS. 1 and 2, each transmitted data packet determines the bus to be used by the entire system 10 for the next transmission of a data packet (regardless of which station originates that transmission). It will be appreciated by those skilled in the art, however, that in other embodiments of the present invention each transmitted data packet can contain a channel selection field which selects busses for more than just the immediately succeeding packet. In still other embodiments, only selected data packets contain the channel selection field, and in that case each channel selection field selects the pattern of bus switchovers until after the next data packet containing a channel selection field is transmitted.

There are several important features of the present invention which contribute to the high reliability of operation of system 10, without a compromise in the performance. First, continuous bus synchronization is achieved under normal operation, so that all stations 12A–12D transmit and receive on only one bus at a time. This is accomplished by the convention that the next bus to be used by any station 12A–12D of system 10 is determined by the channel selection field in the previous data packet. Once bus synchronization is achieved, and as long as there are no communication problems, switchover between bus A and bus B may be accomplished as often as once per data packet, while maintaining perfect synchronization among all of the stations 12A–12D.

When communication problems occur, synchronization may be lost, and must be recovered. Such communication problems fall generally into two classes: detected and undetected errors. The present invention provides rapid recovery of synchronization in the event of both detected and undetected errors.

When a garbled transmission (or no transmission within a time-out) is detected by receiver 20, the receiving station (for example station 12A) has no channel selection field to honor, and therefore it must determine which bus to use internally. Since each station 12A–12D makes its decision individually, different stations will choose different busses in the event of a garbled transmission or no transmission at all, and system 10 becomes momentarily desynchronized.

Desynchronization can also occur when an undetected error causes two stations to disagree on the contents of what appears to be a correct packet. This is unlikely because of error correction codes and redundant information which are typically contained in the data packet, but remains a finite possibility in all communication systems.

When desynchronization occurs, system 10 is instantaneously broken into two groups: those stations communicating on bus A, and those stations communication on bus B. Within groups (assuming no further communication problems) synchronization is restored, except of course there is no communication with the other group. Since bus switchover occurs rapidly and frequently, and since there is sufficient randomness in the factors affecting bus selection by the various stations in each group, the two groups soon chance across each other, and again become synchronized.

A second important feature and advantage of the present invention is the use of distributed decision making in bus selection and switchover. The present invention allows any or all of the stations 12A–12D to participate in the selection of busses. Since all stations are subject to failure, this provides greater reliability than is possible if a single station is responsible for either selecting the bus or in switching over from one bus to the other in the event of communication problems.

A third important feature and advantage of the present invention is the use of individual bus quality statistics by each of the stations 12A–12D to produce local quality factors for each bus. To maintain fast response time despite equipment failures and other communication problems, each station must be able to make fast, reliable bus switchover decisions. These decisions are greatly facilitated by continuously updated, and highly accurate statistics on the quality of each of the buses.

A fourth important feature and advantage of the present invention is the use of frequent switchover among the busses or communication channels. The regular use of all busses provides the most accurate reflection of the ability of each bus to communicate data. Frequent switchover assures that each bus is used on nearly a constant basis, and that quality statistics for each bus are accurate and up-to-date.

A fifth important feature and advantage of the present invention is the use of group statistics on bus quality. A single station may often experience problems which are undetected by other stations of system 10. In the present invention, these problems are reported globally throughout system 10, so that other stations can take action to avoid using the affected equipment.

A sixth important feature and advantage of the present invention is the inclusion of a manual override margin. Manual control may be needed in the event of multiple failures within system 10, or where an unusual communication problem fools the automatic bus switchover mechanisms of the various stations 12A–12D. The use of the manual override margin is also useful to force system 10 to increase traffic on a bad bus to facilitate system maintenance and repair.

Although the present invention may be used with a wide variety of different bus access protocols, one embodiment of the present invention has been used to particular advantage in a system like that described in the previously-mentioned copending patent applications, which use a prioritized time slot protocol with rotating access among the various stations of the system. In this type of system, there are three different classes of data packets which are used: "Broadcast packets, "Point-to-Point" packets, "Idle" packets. The Broadcast packets provide are sent to all stations, and require no explicit packet acknowledgement. Point-to-point packets are directed to a specific destination address and require an answering packet. Idle packets absorb substantially all idle capacity to keep communiation medium 14 in an active state at all times.

The system described in the previously mentioned patent application uses a periodic transmission cycle of predetermined length (such as one-quarter second). During each transmission cycle, each station 12A–12D transmits a broadcast packet which includes the local quality factors for bus A and bus B, as determined by that particular station. Since a broadcast packet is used to transmit the local quality factors, each station 12A–12D coupled to communication medium 14 receives the local quality factors of each of the other stations, and uses those factors in calculating group quality factors.

Each station 12A–12D queues a data packets for transmission over communication medium 14 after every bus transaction. If there is no regular packet traffic waiting (i.e. no broadcast packet or point-to-point packet waiting to be transmitted), each station 12A–12D queues an idle packet instead. The idle packet contains only diagnostic or error checking data, together with the channel selection field which contains the next bus select. Idle messages are queued for transmission at a lower priority than any other type of data packet. Hence, idle packets do not reduce performance or interfere with regular traffic in system 10.

Since there is always a packet queued for transmission by each station 12A–12D, there is a guaranteed maximum time between data packets which are to be transmitted on the selected bus A or B. A station which switches over to a dead bus can detect a violation of this maximum time with a time-out counter (which is contained within receiver 20), and then can switch back to the other bus.

The idle packet traffic also guarantees a continuous level of activity on busses A and B. This continuous activity is required in order to keep the bus quality statistics accurate and up-to-date.

It will be recognized by those skilled in the art that other communication protocols which have higher levels of traffic may not require the use of idle packets. An example of such an alternative bus access protocol is a token pass protocol.

A common anticipated failure in systems like communication system 10 shown in FIG. 1 involves a loose connection at one of the stations to one of the busses. For purposes of illustration, consider an example in which a loose connection exists between station 12A and bus A. In that event, the bus margin for station 12A will heavily favor transmission on bus B (which still has a good connection). Other stations 12B-12D will also tend to favor bus B after failing to receive messages on bus A from station 12A. In addition, the broadcast packets from processor 12A will contain the local quality factors produced by station 12A (which will indicate a strong preference by station 12A for bus B). This will, therefore, affect the bus margins of each of the other stations 12B-12D of system 10.

As a further example of flexibility of system 10, consider the response if both station 12A has a loose connection to bus A and then station 12B has a loose connection to bus B. In prior art systems, bus A would have been disconnected and bus B would be operating, causing station 12B to be completely cut off from communication. In system 10, both busses A and B would be operating with only losses of messages between stations 12A and 12B. In a further preferred embodiment, station 12C receives messages from station 12A on bus B and from station 12B on bus A and retransmits the messages to station 12B on bus A and to station 12A on bus B. Thus, no messages are lost.

It can be seen, therefore, that a failure such as a loose connection will cause a shift in the proportionate traffic on the two busses A and B in order to compensate for problems encountered with one of the two busses. The trouble-shooting of system 10 by a service personnel is greatly facilitated by simply requesting that the bus margins of each of the stations 12A-12D be displayed. A great disparity between the bus margin of one of the stations (in this case station 12A) with respect to the other stations (12B-12D) helps the service personnel to identify the likely location of problems in the communication system.

Although the present invention has been described with reference to preferred embodiments, workers skilled in the art will recognize that changes may be made in form and detail without departing from the spirit and scope of the invention. For example, although the present invention has been described with reference to the two communication busses and four stations, the number of busses and stations can and will vary depending upon system requirements. In addition, although communication busses have been specifically described, it will be recognized that other forms of communication channels, such as optical waveguides and radio or microwave communication channels can be used in accordance with the present invention.

What is claimed is:

1. A common communication system having a plurality of stations, each of which is coupled to at least two active communication channels for communicating packets between the stations, each of the stations comprising:
    transmitter means selectively coupled to each channel for transmitting packets;
    receiver means selectively coupled to each channel for receiving packets;
    channel quality assessment means coupled to the receiver means for assessing the quality of each of the channels based on previous use of the channels and providing a quality factor for each channel; and
    channel selection means coupled to the channel quality assessment means, the transmitter means and the receiver means for selecting the channel from among the active channels on which at least one subsequent packet is to be transmitted and received as a function of the quality factors, such that use of the active channels alternates.

2. The system of claim 1 wherein the channel quality assessment means provides a first local quality factor representative of the operating condition of a first channel, and a second local quality factor representative of the operating condition of a second channel.

3. The system of claim 2 wherein the first local quality factor is a function of at least one of the packets previously received on the first channel wherein the second local quality factor is a function of at least one of the packets previously received on the second channel.

4. The system of claim 3 wherein the packets comprise serial digital error-encoded data and the first and second local quality factors are functions of proportions of packets received in error from the first and second channels, respectively.

5. The system of claim 3 wherein the packets comprise serial digital error-encoded data and the first and second local quality factors are functions of proportions of packets transmitted in error from the first and second channels, respectively.

6. The system of claim 5 wherein the receiver means provides a timeout error signal to the channel quality assessment means after a predetermined length of time within which no packets from a channel are received, and wherein the local quality factors are functions of the timeout error signals.

7. The system of claim 3 wherein the transmitter means of each station periodically transmits its local quality assessment factors to the other stations.

8. The system of claim 7 wherein the channel quality assessment means further provides a first group quality factor for the first channel as a function of the first local quality factors received from each of the stations, and a second group quality factor for the second channel as a function of the second local quality factors received from each of the stations.

9. The system of claim 8 wherein the channel selection means provides a channel margin as a function of the first and second local quality factors and the first and second group quality factors.

10. The system of claim 9 wherein the channel selection means selects the channel on which at least one subsequent packet is to be transmitted and received as a function of the channel margin.

11. The system of claim 10 wherein the channel selection means comprises an integrating controller which is responsive to a setpoint and a measured variable, and wherein the channel margin is the setpoint and wherein a presently selected channel is the measured variable.

12. The system of claim 3 wherein certain packets transmitted by a station require an acknowledge packet from another station and wherein the first and second local quality factors are functions of acknowledge signals not received.

13. The system of claim 1 wherein each packet transmitted by a station includes a channel selected field which identifies the channel selected by the channel selection means, and wherein each station receiving the packet selectively couples its transmitter and receiver means to the channel identified by the channel selection field for a subsequent transmission of a packet.

14. A common communication system for a distributed process control system comprising:
   a plurality of active communication channels for carrying encoded packets; and
   a plurality of stations, each of which is coupled to each channel for processing the packets, each station comprising:
   means selectively coupled to each channel for transmitting and receiving packets;
   means for providing channel quality factors for each channel as a function of at least one of the packets previously received over that channel;
   means for selecting one channel from among the plurality of active channels on which to transmit and receive at least one of the next packets as indicated by a previous packet; and
   means for determining which channel the next packet transmitted by that station will identify for use by all of the stations in transmitting and receiving at least one subsequent packet as a function of the quality factors, such that use of the active channels alternates.

15. A common communication system having a plurality of stations coupled to a plurality of active communication channels for transmitting data packets among the stations, each station comprising:
   transmitter means for transmitting data packets, each data packet including a channel selection field which identifies a selected channel from among the active channels for a succeeding transmission of a data packet;
   receiver means for receiving data packets and providing an indication of the selected channel contained in the channel selection field of the received packet;
   quality assessment means for maintaining quality factors for each channel based upon occurrence of communication errors when that channel is in use;
   margin computation means for determing a channel margin based upon the quality factors;
   means for coupling the station to the selected channel contained in the channel selection field of the received data packet; and
   means for determining the selected channel to be identified by the channel selection field of the data packet transmitted by the transmitter means based upon the channel margin, such that all of the active channels are regularly selected.

16. In a common communication system in which packets are transmitted and received among a plurality of stations, each of which is coupled to a plurality of active communication channels, the improvement comprising:
   means for assessing quality of communications over each of the active channels based upon previous use of each of the channels;
   means for causing the stations to alternately select, in synchronism, the channel from among the plurality of active channels for transmission and reception of at least one packet as a function of the assessed quality of each channel, such that use of the active channels alternates.

17. The invention of claim 16 wherein the means for causing the stations to alternately select periodically transmits to all stations a packet containing a channel selection field which identifies the channel for transmission and reception of at least one packet.

18. A common communication system having a plurality of stations for transmitting and receiving packets over a plurality of active communication channels, characterized by each station assessing quality of communications over each of the active channels based upon previous use of each of the channels and each station having an opportunity to select the channel from among the plurality to use in a subsequent transmission based upon its assessment of quality, such that all of the active channels are regularly selected.

19. The common communication system of claim 18 wherein each station provides, during a transmission, its own assessment of quality of communications over each of the active channels, and wherein each station, when selecting the channel for a subsequent transmission, bases the selecting on its own assessment of quality and the assessments of quality of the other stations of the common communication system.

* * * * *